United States Patent

[11] 3,588,726

[72] Inventor Wallace J. Kabrick
Plainville, Ill.
[21] Appl. No. 758,822
[22] Filed Sept. 10, 1968
[45] Patented June 28, 1971
[73] Assignee Harris-Intertype Corporation
Cleveland, Ohio

[54] AUDIO PEAK LIMITER AND PEAK SWITCHING CIRCUIT
12 Claims, 4 Drawing Figs.

[52] U.S. Cl. 330/29, 330/51, 330/145
[51] Int. Cl. H03g 3/30
[50] Field of Search 330/51, 29, 145; 325/413, 65; 332/37

[56] References Cited

UNITED STATES PATENTS

| | | | |
|---|---|---|---|
| 3,015,782 | 1/1962 | Pihl | 330/145 |
| 3,169,229 | 2/1965 | Ulzurrun | 330/145X |
| 3,398,381 | 8/1968 | Torick et al. | 332/37X |
| 3,441,748 | 4/1969 | Werner | 330/29UX |

*Primary Examiner*—John Kominski
*Assistant Examiner*—James B. Mullins
*Attorney*—Hill, Sherman, Meroni, Gross and Simpson

ABSTRACT: A limiter and peak phase switching circuit having a pair of transistors coupled in shunt with an input transformer and performing the function of a controlled variable impedance element to limit the output of the network. A negative and positive peak detector senses the absolute magnitude of the negative going and positive going portions of the audio signal and through the use of a field effect transistor and a flip-flop circuit, switches the polarity of the input terminals of the network to avoid excessive negative modulation. The output of the positive and negative peak detectors are rectified and utilized to develop a control signal which is then coupled to the input circuit of a pair of transistors used as the variable impedance element. This control signal acts as a feedback to yield the required limiting action. The limiter includes means for asymmetrically limiting the positive and negative peaks by altering the bias applied to a pair of diode detectors.

INVENTOR.

Wallace J. Kabrick

BY Hill, Sherman, Meroni, Gross & Simpson ATTORNEYS

INVENTOR.

Wallace J. Kabrick

BY Hill, Sherman, Meroni, Gross & Simpson ATTORNEYS

INVENTOR

Wallace J. Kabrick

BY Hill, Sherman, Meroni, Gross & Simpson ATTORNEYS

INVENTOR.

Wallace J. Kabrick

BY Hill, Sherman, Meroni, Gross & Simpson ATTORNEYS

AUDIO PEAK LIMITER AND PEAK SWITCHING CIRCUIT

BACKGROUND OF THE INVENTION

Field of the Invention

The field of art to which this invention pertains is an audio peak limiter and peak switching circuit and in particular a limiting circuit and also to an automatic polarity reversing circuit for increasing the modulation efficiency by maintaining the larger of the positive and negative going peaks of the audio signal directed in a positive going sense.

SUMMARY OF THE INVENTION

It is an important feature of the present invention to provide an improved audio peak limiter and peak switching circuit.

It is also a feature of the present invention to provide an improved peak phase detection circuit and to provide a network for automatically reversing the polarity of the input audio signal when the negative audio peaks otherwise exceed the positive audio peaks.

It is a principal object of the present invention to provide an improved circuit for detecting the positive and negative peaks of an audio signal and for utilizing the information so detected for reversing the polarity of the input audio signal in order to avoid excessive negative modulation and the adverse effects thereof.

It is another object of the present invention to provide a peak phase switching circuit which includes means for sensing the instantaneous peaks, both negative and positive, respectively, of the audio signal and for comparing the two to develop a control signal which is then utilized to automatically switch the input terminals of the limiter circuit whenever the negative portion of the output audio signal leaves the positive portion thereof.

It is a further object of the present invention to provide a peak phase detection circuit for a limiter as described above wherein the instantaneous peak magnitudes are coupled to a common circuit point and wherein the difference between the two signals so compared are utilized to trigger a field effect transistor which in turn operates a bistable circuit for reversing the polarity of the input terminals of the limiter.

It is also an object of the present invention to provide a limiter for a radio frequency transmitter which utilizes a controlled variable impedance shunt path which is coupled across the secondary winding of the audio input transformer to produce a limiting action at the output thereof.

It is a further object of this invention to provide a limiter as described above wherein the controlled variable impedance path comprises first and second transistors having a common base circuit and having the emitter circuit of each coupled to the collector circuit of the other transistor. A feedback signal is coupled to the common base connection to vary the emitter to collect resistance of the transistors and thereby produce the required limiting action at the output audio transformer.

These and other objects, features, and advantages of the present invention will be understood in greater detail from the following description and the associated drawings wherein reference numerals are utilized to designate an illustrative embodiment.

DESCRIPTION OF THE PREFERRED EMBODIMENT

Figure 1:
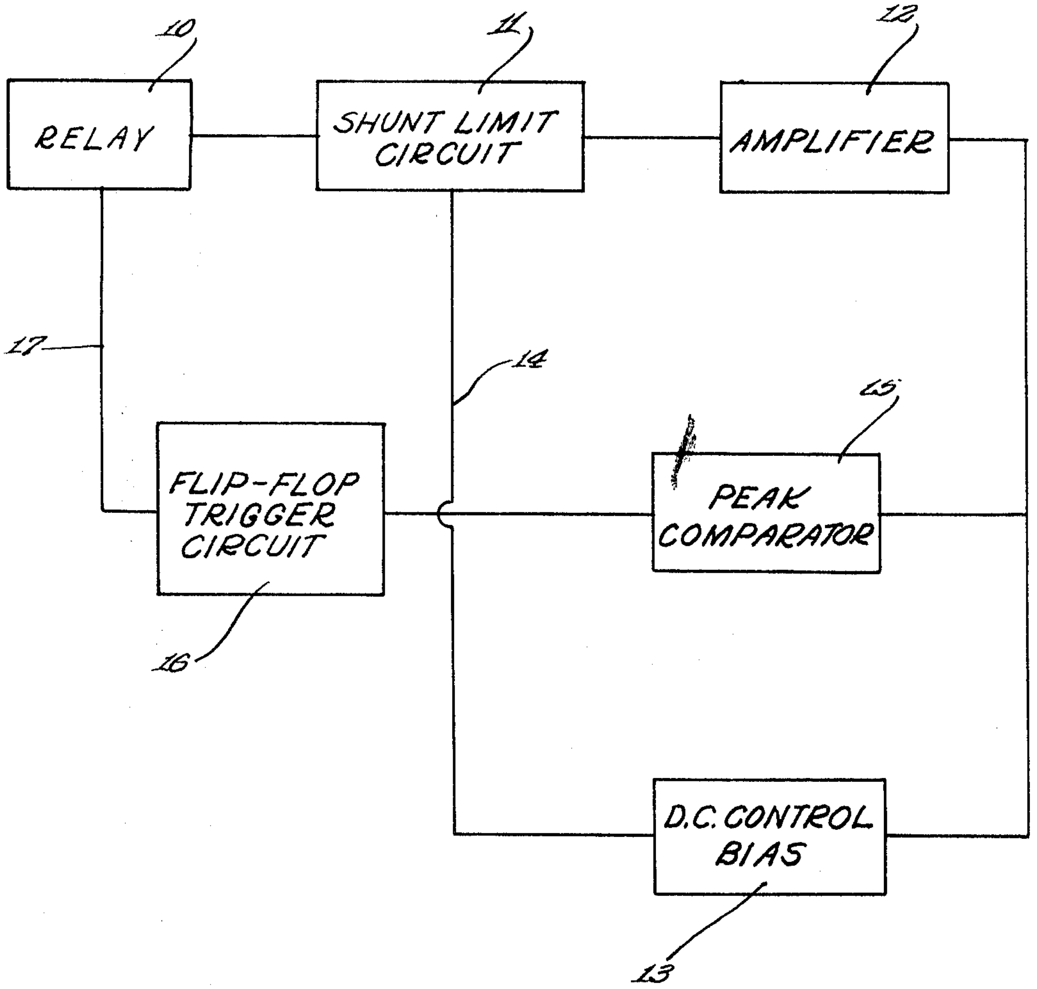
FIG. 1 is a block diagram of a limiter and peak phase shifting network of the present invention.

Generally, FIG. 1 shows a relay 10 which may be used to switch the polarity of the input audio signal which is applied to the limiter circuit.

The relay is coupled to a shunt limit circuit which is also the shunt connected controlled variable impedance element as described above which is utilized to perform the limiting action. The circuit 11 is the coupled to a standard amplifier, the output of which is utilized to develop a DC control bias 13 which in turn is fed back through a line 14 to the shunt limit circuit 11 to perform the control function.

The output of the amplifier 12 is also coupled to a peak comparison circuit 15 which in turn is coupled to a flip-flop trigger circuit 16. The output of the trigger circuit is then coupled back to the relay 10 by means of a circuit line 17. Accordingly, the flip-flop trigger circuit provides a means for energizing the relay which, in turn, reverses the polarity of the input audio terminals.

Figure 2:
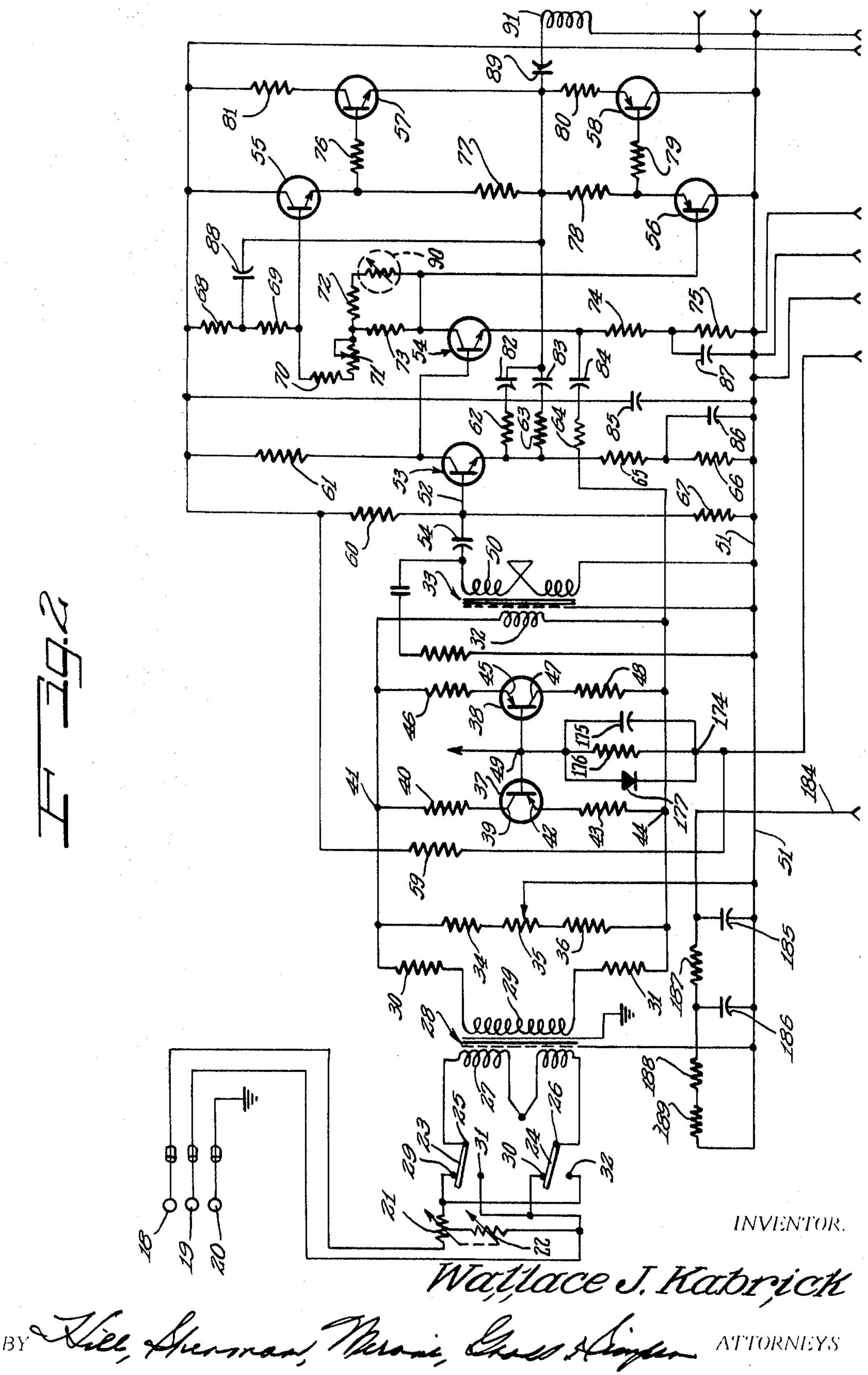
FIG. 2 is a first portion of a detailed schematic of the circuit of FIG. 1 and is principally directed to the limiter portion of the circuit.
Figure 3:
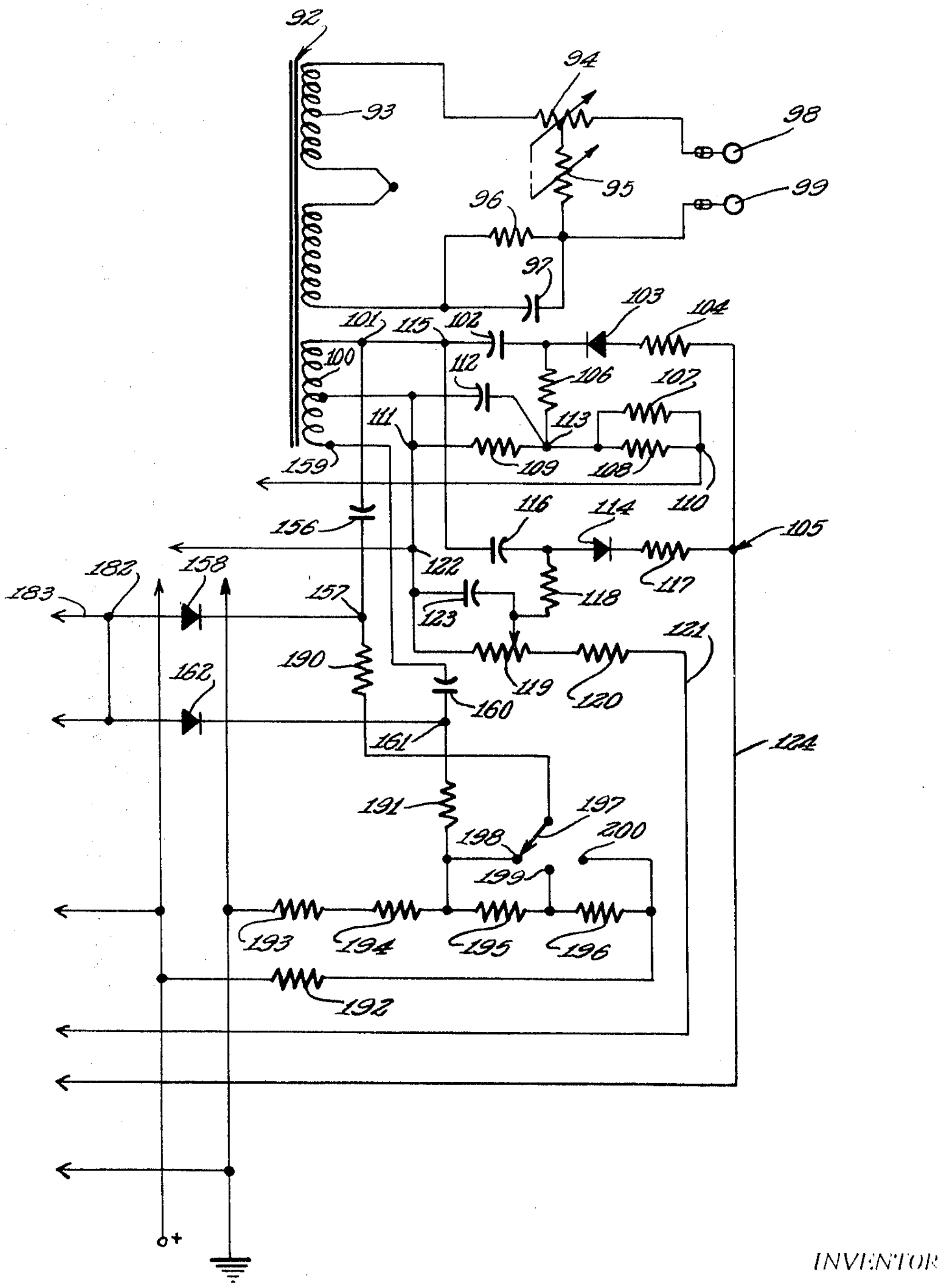
FIG. 3 is a further portion of the schematic associated with FIG. 2 and primarily shows the peak detection portion of the network.
Figure 4:
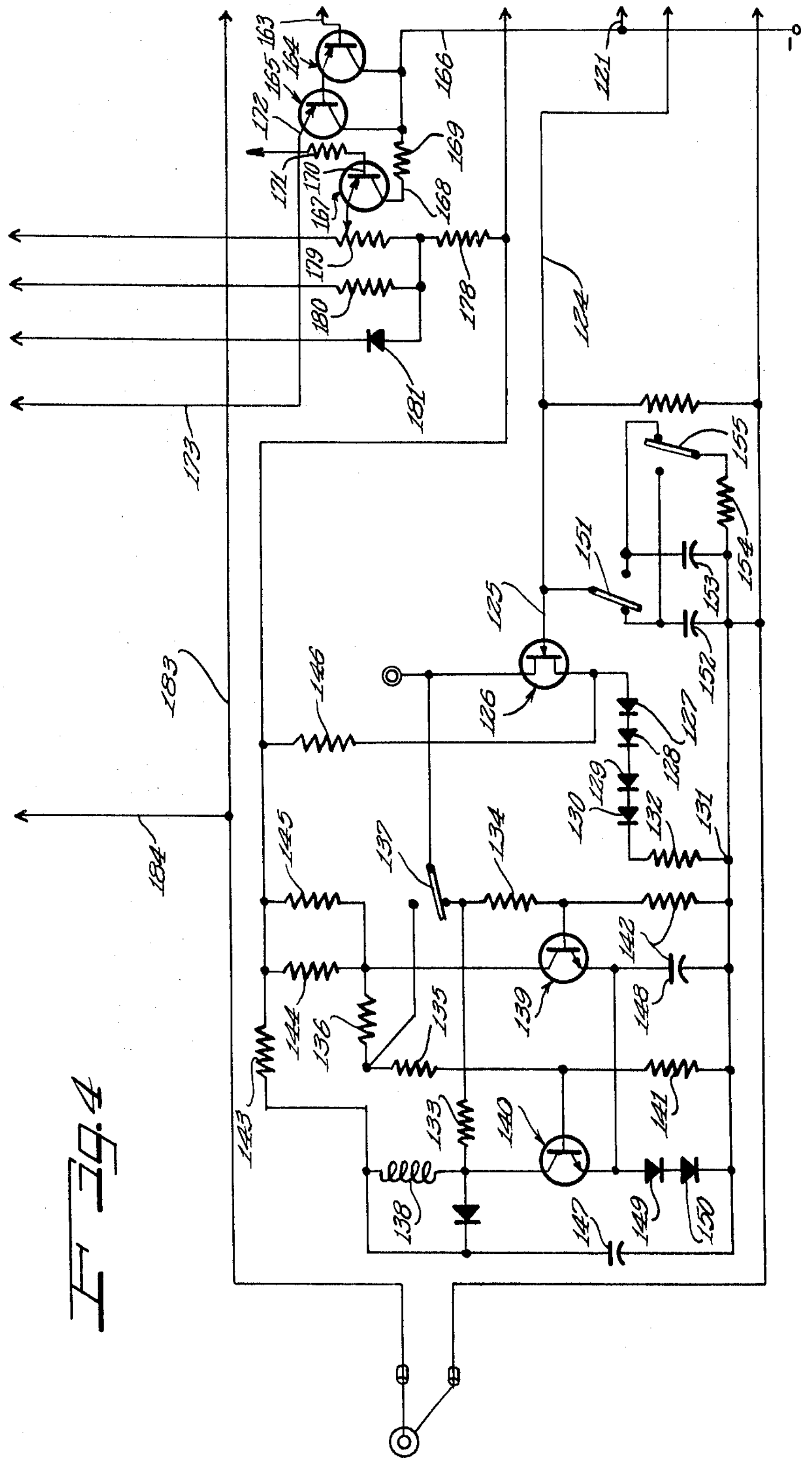
FIG. 4 is the remaining portion of the schematic associated with FIGS. 2 and 3 and primarily shows the electronic circuit for performing the switching function required to reverse the polarity of the input audio transformer.

The detailed schematic which is shown in portions in FIGS. 2, 3, and 4 has a series of input terminals 18, 19, and 20 to which may be coupled an audio information signal. The audio signal is then applied through a pair of resistors 21 and 22 to a double pole-double throw set of contacts 23 and 24.

The contacts 23 and 24 have terminals 25 and 26 respectively which are coupled to a primary winding 27 of an input transformer 28. It will be apparent from a study of the contacts of the switches 23 and 24 that the polarity of the audio information signal as established at the terminals 18, 19, and 20 is reversed by moving the switch arms 23 and 24 from the terminals 29 and 30 as shown to the terminals 31 and 32. Accordingly, one of the objects of this circuit is to provide a means for actuating the switch 23 and 24 whenever the negative portion or negative peaks of the audio signal exceeds the positive peaks thereof. In this way, the modulation efficiency can be increased without producing the undesirable effects of excessive negative modulation.

The transformer 28 has a secondary winding 29 which is coupled through a pair of resistors 30 and 31 to a primary winding 32 of an output transformer 33. The winding 29 is terminated in a series of resistors 34, 35, and 36.

A pair of transistors 37 and 38 are coupled in shunt across the secondary 29 as shown. In particular, the transistor 37 has its collector 39 coupled through a resistor 40 to a terminal 41 associated with the primary winding 29. Also the transistor 37 has its emitter 42 coupled through a resistor 43 to a terminal 44 associated with the opposite side of the secondary winding 29.

In a similar manner, the transistor 38 has its emitter 45 coupled through a resistor 46 to the terminal 41. Also, the collector 47 thereof is coupled through a resistor 48 to the terminal 44. Each of transistors 37 and 38 has their base connections coupled as at the circuit point 49.

It is apparent, then, that if means can be provided to vary the effective resistance between the emitter to collector junctions of the respective transistors, the output signal appearing across the primary winding 32 of the transformer 33 can be varied. It has been found that by the connection of the transistors as shown, the nonlinearities associated with the base to collector junctions of each of the transistors can be counterbalanced by the base to emitter junction of the other transistor, thereby producing a more linear resistance from transistors 37 and 38.

The transformer 33 has a secondary winding 50 which is coupled between a ground line 51 and a base 52 of a transistor 53. A capacitor 54 is coupled between the winding 50 and the base 52 as shown.

The portion of the circuit which includes the transistors 53, 54, 55, 56, 57, and 58 and the associated resistors 59—81 as well as the capacitors 82—89, comprise a standard amplifier for increasing the magnitude of both the negative going and positive going portions of the audio signal. A thermister 90 may also be provided in standard fashion to compensate for temperature changes associated with the amplifier circuit.

The output of the amplifier, as indicated above, is coupled to a primary winding 91 of an output audio transformer 92. The transformer 92 has a secondary 93. The secondary 93 has a series of resistors, 94, 95, and 96, and a capacitor 97, coupled across the winding, and the output audio signal is taken from a pair of terminals 98 and 99. A further secondary winding 100 couples the output audio signal to the peak comparison circuit which is shown in FIG. 1 by the reference numeral 15.

Essentially, the secondary winding 100 has a terminal 101 which is coupled through a capacitor 102 to a peak detection diode 103. The output of the diode 103 is coupled through a resistor 104 to a common circuit point 105.

The diode 103 is biased through a series of resistors 106, 107, 108, and 109 from a positive DC supply at the circuit junction point 110 to circuit ground at the point 111. A capacitor 112 is coupled from the secondary center tap to a circuit junction point 113 which is intermediate the resistors 108 and 109. The biasing resistors indicated above establish a bias for the diode 103 such that it will conduct only when the negative signal applied thereto exceeds a given value such as, for instance, a greater negative value than −9 volts.

A second diode detector 114 is coupled from a circuit junction point 115 through a capacitor 116 to a resistor 117 and hence to the common circuit point 105. The diode 114 is biased through a series of resistors 118, 119, and 120 from a negative voltage supply at the line 121 to ground at the terminal point 122. A capacitor 123 is coupled across the adjustable bias resistor 119.

Through the use of the diodes 103 and 114, the negative going peaks and the positive going peaks are compared at the circuit junction point 105. When the positive going peak exceeds the negative going peak, a signal is developed at the junction point 105 which is coupled through the line 124 to a gate 125 of a field effect transistor 126. Here it is the excess of positive going signal which is used to trigger the field effect transistor 126. Of course, this polarity is related to an excess of negative going signal at the output of the transformer 92 by means of polarity reversals through the windings of the transformer coils.

The field effect transistor 126 is biased into partial conduction by means of selected diodes 127—130 which are coupled to circuit ground at a point 131 through a resistor 132. Accordingly, a drain voltage of between, for instance 8.5 and 10.5 volts is obtained. This voltage is then applied to the junction of resistors 133 and 134 or to the junction of resistors 135 and 136 depending upon the position of a switch 137. A relay coil 138 is the relay which operates the double pole-double throw switch 23 and 24 as well as the switch 137. Transistors 139 and 140 and the associated circuitry including resistors 141, 142, 143, 144, 145, and 146 as well as capacitors 147 and 148 together with a pair of biasing diodes 149 and 150 are connected in a flip-flop or bistable multivibrator circuit. This circuit is used to control the polarity of the signal into the transformer 28 by the position of the contacts 23 and 24.

The action of the automatic peak phasing of the limiter is essentially as follows: When the positive peaks on the terminal 101 of the transformer 92 are sufficiently larger than the negative peaks to cause a positively rectified signal (by the action of diodes 103 and 114) to predominate at the gate of the field effect transistor 126 with a magnitude that will cause the drain voltage of the transistor 126 to drop to approximately, for instance, 6.0 volts, transistor 139 will be cut off, and the transistor 140 will conduct, causing relay coil 138 to energize and reverse the phase of the signal into the transformer 28. A relay switch 151 will switch the gate 125 of transistor 126 from a capacitor 152, which had been previously charged, to a capacitor 153 which has been discharged through a resistor 154 and a contact 155, to begin a timing sequence. Essentially, until the capacitor 153 is suitably charged, the presence of excessive positive peaks at the circuit junction point 105 will not trigger the transistor 126.

The contact 155 is also triggered by the relay coil 138. Accordingly, each time the relay operates, the contact 155 reverses position, thereby coupling a discharged capacitor to the gate 125 of the transistor 126. Therefore, it takes a certain number and/or width of positive pulses to cause flip-flop action of the circuit.

After the phase reversal of the input signal, the peaks which were polarized positively enough to cause the flip-flop are now polarized negatively. Predominant negative peaks will simply drive transistor 126 further toward cutoff and it will not cause flip-flop action of the subsequent circuitry.

If the peak level of the signal source again becomes predominantly positive, the circuit will repeat the action described above. Thus, automatic peak phasing is achieved on a continuous basis, regardless of the number of times the input signal changes.

The limiter action of the circuit is achieved by coupling the circuit point 101 through a capacitor 156 to a circuit point 157 which is the cathode of a diode 158. The other terminal 159 of the winding 100 is coupled through a capacitor 160 to a circuit junction point 161 which is the cathode of a further diode 162. Accordingly, a rectified signal appears at a base 163 of a transistor 164. The transistor 164 is one of two transistors, the other transistor being 165, of a compound amplifier.

The collector of the transistor 164 is coupled by means of a circuit line 166 to a negative supply voltage. The collectors of the two transistors 164 and 165 are coupled together as shown. A further transistor 167 has its collector 168 coupled through a resistor 169 to the circuit line 166. The base 170 thereof is coupled through a resistor 171 to circuit point 49 intermediate the base circuits of the two transistors 38 and 39 of the shunt-controlled variable impedance elements. The emitter 172 is coupled through a circuit line 173 to a circuit junction point 174. A parallel network consisting of a capacitor 175, a resistor 176, and a diode 177 are coupled from the circuit junction point 174 to the base connection 49 of the transistors 38 and 39. It is noted that bias for the transistor 167 is provided through a series of resistors 178, 179, 180, and a diode 181.

The output of the rectifiers 158 and 162 as developed at the circuit junction point 182, is coupled through a line 183 and a further circuit line 184 to a filter network which includes capacitors 185 and 186 and resistors 187, 188, and 189. The other terminal of the filter network is connected to the ground line 51. Assuming the output of the limiter circuit to drop sharply, the filter network described, provides a recovery time before the output of the limiter will increase its gain. In this way, an average output of the circuit is utilized to adjust the gain of the limiter.

Asymmetrical limiting can be achieved by means of a series of resistors 190, 191, 192, 193, 194, 195, and 196, together with a variable contact 197 and a number of contact points 198, 199, and 200. By varying the position of the contact 197, the bias to the diode 158 can be varied with respect to the bias supplied to the diode 162. In this way, limiting can be achieved so as to allow higher positive peaks to exist at the output of the transformer 92 before limiting is effected relative to the level of the negative peaks permitted before limiting is effected.

For instance, the contact point 198 may be utilized as the 100 percent modulation point, the contact 199 can be utilized as the 110 percent modulation point, and the contact 200 utilized as the 120 percent modulation point.

Full advantage of the automatic peak phasing is realized when the contact 197 is switched to the 110 percent or the 120 percent or asymmetrical position to prevent peak limiting action at the same level on those peaks which cause positive modulation compared with those which cause negative modulation. Few amplitude modulated transmitters will deliver more than 120 percent positive peak modulation, thus, the circuitry is restricted to this to prevent overloading it. However, much higher operation of the positive modulation peaks can be obtained by increasing the back bias through a resistor 190 to diode 158, if desired.

The operation of the flip-flop or automatic peak phasing circuit is enhanced in the 110 percent and 120 percent positions of contact 197, due to the peak limiting circuit, allowing greater signal levels to appear at the output of the limiter. This is a result of the smaller peak causing limiting rather than the larger peak, until the larger or positive modulation peak exceeds the negative modulation peak by 10 percent or 20 percent, depending upon the position of contact 197.

Assume there is a 15 percent unbalance in the peaks of opposite polarity. With symmetrical limiting, the high peak will be the one that determines 100 percent modulation, regardless of whether it is the positive or negative modulation peak. The peak limiter would then prevent overmodulation, but it would not permit the transmitter to deliver maximum output because one peak would be approximately 85 percent modulation, while the other would be at 100 percent.

With positive modulation peak phasing and contact 197 set to 110 percent, the output would increase to 110 percent on the positive and approximately 95 percent on the negative modulation peaks.

With positive modulation peak phasing and contact 197 set to 120 percent, the output would increase to 115 percent on the positive and 100 percent on the negative modulation peaks, without negative overmodulation. Thus, the value of asymmetrical limiting plus automatic peak phasing is realized.

I claim:

1. In an audio peak limiting amplifier, a peak switching circuit comprising:
   a polarity reversing switching means for alternately reversing the polarity of an input information signal;
   a peak comparison circuit;
   circuit means for coupling an input information signal from said polarity reversing switching means to said peak comparison circuit;
   said peak comparison circuit having means for comparing the instantaneous positive and negative peaks of said input information signal and for generating a trigger signal which is indicative of the relative absolute magnitudes of said positive and negative peaks;
   trigger means for actuating said polarity reversing switching means; and
   said trigger means being responsive to said trigger signal only when a predesignated one of said positive and negative peaks exceeds the other.

2. A peak switching circuit in accordance with claim 1 wherein said peak comparison circuit comprises:
   first and second diodes;
   a common circuit point;
   said first diode having an input coupled to said circuit means so as to conduct only during positive portions of said information signal, and having an output coupled to said common circuit point; and
   said second diode having an input coupled to said circuit means so as to conduct only during negative portions of said information signal and having an output coupled to said common circuit point, and wherein said trigger signal is derived at said common circuit point.

3. A peak switching circuit in accordance with claim 2 wherein means are provided to bias said first and second diodes to conduct only during the positive and negative peaks respectively of said information signal.

4. A peak switching circuit in accordance with claim 2 wherein said trigger means comprises a field effect transistor and wherein said trigger signal is coupled to the gate of said field effect transistor.

5. A peak switching circuit in accordance with claim 4 wherein a flip-flop circuit is coupled to the output of said field effect transistor and is responsive to the firing of said field effect transistor for changing its state from a first stable state to a second stable state and wherein one of said states is used to actuate said polarity reversing switching means and the other of said states is used to deactuate the same.

6. In an audio peak limiting amplifier a peak switching circuit comprising:
   an input transformer for receiving an information signal;
   a polarity reversing switching means coupled to the input of said transformer for reversing the polarity of the information signal applied thereto;
   an output transformer;
   amplifier means for coupling the information signal from the output of said input transformer to the input of said output transformer;
   means sampling the positive and negative peaks of the information signal at the output of said output transformer;
   means comparing the absolute magnitudes of the sampled positive and negative peaks; and
   trigger means responsive to the excess of a predetermined one of said peaks over the other for actuating said polarity reversing switching means.

7. A peak switching circuit in accordance with claim 6 wherein said comparison means comprises:
   first and second diodes coupled in opposite polarity to the output of said output transformer and being biased to conduct during positive and negative portions respectively of said information signal;
   a common circuit point; and
   means for coupling the outputs of said first and second diode to said common circuit point to develop a difference signal thereby.

8. A peak switching circuit in accordance with claim 7 wherein said trigger means comprises a trigger circuit element and a bistable circuit coupled to the output of said trigger circuit element, said bistable circuit being coupled to actuate said polarity reversing switch when in a first state and to deactuate the same when in a second state.

9. In an audio peak limiting amplifier a peak switching circuit comprising:
   a polarity reversing switching means for alternately reversing the polarity of an audio input signal to said limiting amplifier;
   means for sensing the positive and negative peaks of the audio signal applied to said limiting amplifier;
   means for generating a trigger signal when a predetermined one of said positive and negative peaks exceeds the other; and
   means utilizing said trigger signal to actuate said polarity reversing switching means.

10. In an audio peak limiting amplifier a limiter comprising:
   first and second transformers;
   means for coupling an audio signal across the primary of said first transformer;
   means for coupling the primary of said second transformer across the secondary of said first transformer, first and second transistors coupled in shunt across the secondary of said first transformer;
   said first and second transistors having base circuits commonly coupled and each having its emitter circuit coupled to the collector circuit of the other;
   means for sensing the positive and negative peaks developed across the secondary of said second transformer and for developing a control signal in response thereto; and
   means for applying said control signal to said commonly coupled base circuits for varying the effective impedance between the emitter to collector circuits of each of said transistors, thereby controlling the level of the signal delivered to said second transformer.

11. The combination of a limiter and a peak switching circuit comprising:
   a variable impedance network having a pair of output terminals and a pair of input terminals;
   a polarity reversing switching means coupled to said input terminals for alternately reversing the polarity of an audio signal being applied thereto;
   means for coupling a load across said output terminals, a variable controlled impedance coupled in shunt with both said input and said output terminals;

means for sensing the positive and negative peaks of the audio signal applied to said limiter;

means for generating a trigger signal where a predetermined one of said positive and negative peaks exceeds the other;

means utilizing said trigger signal to actuate said polarity reversing switching means;

means coupled to said sensing means for developing a control signal in response to changes in the levels of said positive and negative peaks; and means for coupling said control signal to said variable controlled impedance to increase or decrease the impedance thereof as required to limit the magnitude of the signal developed across said load.

12. In an audio peak limiting amplifier the combination of:

an input circuit;

switch means for reversing the polarity of an audio signal, applied to said input circuit;

an output circuit;

means for coupling said audio signal from said input circuit to said output circuit;

means for detecting the positive and negative peaks of said audio signal at said output circuit;

means responsive to the excess in magnitude of the negative of said peaks over the positive thereof for triggering said switch means; and an asymmetrical limiting circuit means for causing limiting to be initiated at a higher peak level in one parity sense than the other, whereby the combination of peak phasing and asymmetrical limiting can produce up to 100 percent modulation in the negative direction without generating excessive negative modulation.